United States Patent [19]

Harada et al.

[11] Patent Number: 4,693,563

[45] Date of Patent: Sep. 15, 1987

[54] FERRO-ELECTRIC LIQUID CRYSTAL ELECTRO-OPTICAL DEVICE

[75] Inventors: Takamasa Harada; Masaaki Taguchi, both of Tokyo, Japan

[73] Assignee: Seiko Instruments & Electronics Ltd., Tokyo, Japan

[21] Appl. No.: 750,093

[22] Filed: Jun. 28, 1985

[30] Foreign Application Priority Data

Jul. 5, 1984 [JP] Japan ................................ 59-139285

[51] Int. Cl.$^4$ ............................................... G02F 1/13
[52] U.S. Cl. ................................................. 350/350 S
[58] Field of Search ...................... 350/350 S, 333, 336

[56] References Cited

U.S. PATENT DOCUMENTS 4,548,476 10/1985 Kaneko ............................ 350/350 S

OTHER PUBLICATIONS

Meyer et al., "Ferroelectric Liquid Crystals", Le Journal de Physique–Letters Mar. 1975 pp. L-69-L-71.
Clark et al., "Submicrosecond Bistable Electro-Optic Switching in Liquid Crystals", Appl. Phys. Lett., Jun. 1980, pp. 899-901.

Primary Examiner—L. T. Hix
Assistant Examiner—Brian W. Brown
Attorney, Agent, or Firm—Bruce L. Adams; Robert E. Burns; Emmanuel J. Lobato

[57] ABSTRACT

A ferro-electric liquid crystal electro-optical device, e.g., a display device or a shutter for a printer. The electro-optical device is driven in time-shearing. The device comprises a panel having a ferro-electric liquid crystal disposed between scanning electrodes and display electrodes, a drive portion for driving the panel and a control portion for controlling the drive portion. The panel can be driven by scanning only a part of the scanning electrodes for partially rewriting.

20 Claims, 18 Drawing Figures

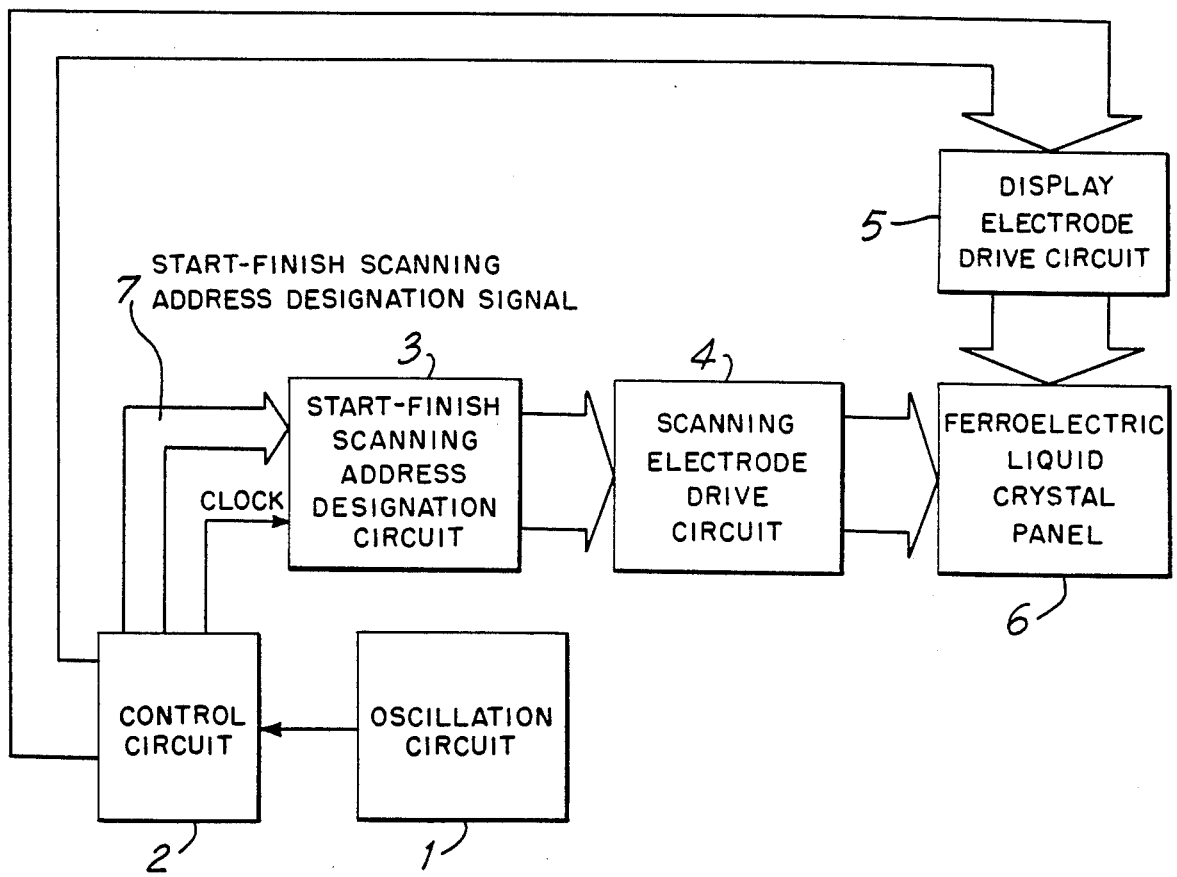
FIG. 1
 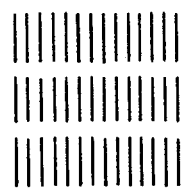 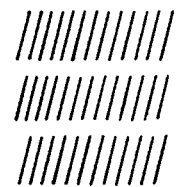
FIG. 2a    FIG. 2b    FIG. 2c

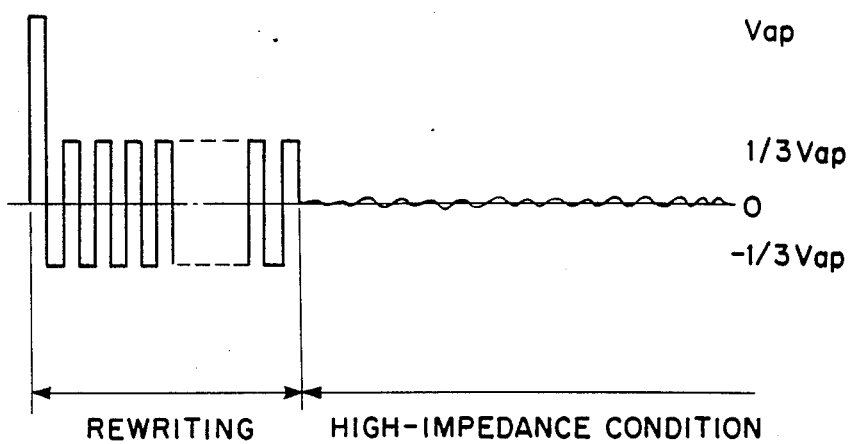
FIG. 9
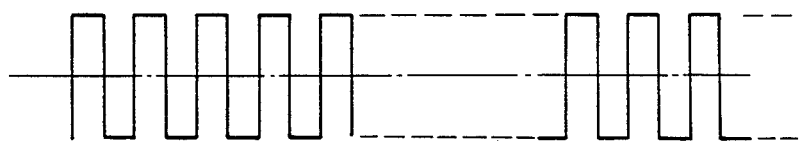
FIG. 10a
FIG. 10b
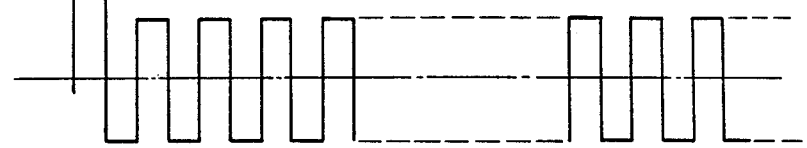
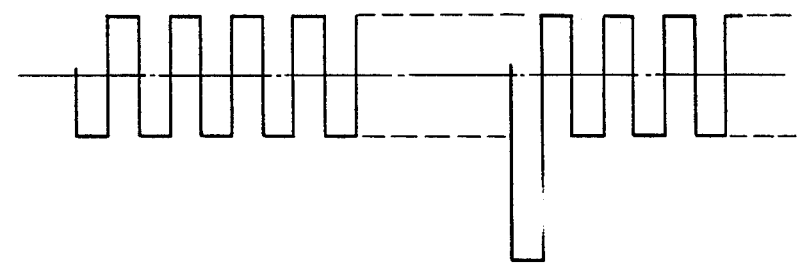
FIG. 10c

FERRO-ELECTRIC LIQUID CRYSTAL ELECTRO-OPTICAL DEVICE

BACKGROUND OF THE INVENTION

This invention relates to a ferro-electric liquid crystal electro-optical device, for example, a display device and a shutter for a printer.

A liquid crystal panel has many exceeding advantages such as small and thin size, and its electric consumption is low. Therefore, the liquid crystal panel is largely used in indicators of watches and calculators.

The liquid crystal used in these displays is thermotropic liquid crystal, and therefore, assumed many kinds of liquid crystal phases in a given temperature range. These liquid crystal phases are classified into two categories, the nematic phase (hereinafter referred to as N) which does not have the layer structure, and the smectic phase (hereinafter referred to as Sm) which has the layer structure.

Sm is classified again into one-axis smectic A phase (hereinafter referred to as Sm A), and two-axis smectic C phase (hereinafter referred to as Sm C). The thickness of the layers approximately corresponds to the length of one molecule of a liquid crystal.

FIGS. 2a, 2b and 2c show typical diagrams of the molecule orientation of N, Sm A, and Sm C. FIG. 2a shows N, FIG. 2b shows Sm A, and FIG. 2c shows Sm C.

Furthermore, if the liquid crystal molecules have the asymmetric carbon and do not have the racemic body, the liquid crystal assumes the spiral structure. In the case of N, the long axis of liquid crystal molecule is along the thin layers, and is also oriented to the same direction. Then N becomes the chiral nematic in which each layer holds same direction of the molecules, and adjacent layers are with each other.

FIG. 3 shows a typical molecule orientation of the chiral nematic. In this case, the molecules 8 are spirally oriented and the normal direction of the layer is identical to the spiral axis.

FIG. 4a shows a typical molecule orientation of the chiral smectic C phase (hereinafter referred to as Sm C*).

Explanation of Sm C* as is follows;

The long axis of liquid crystal molecule 8 (hereinafter referred to as molecule axis) in one layer inclines $\theta$ degrees relative to the normal direction of the layer, and this angle is identical in any layer.

FIG. 4b shows the relation between the molecule axis and the normal direction of the layer.

Meanwhile, when viewing the molecule orientation of Sm C* from the normal direction of the layers, the direction angle $\phi$ rotates in successive layers at a fixed value (FIG. 4a shows the change where the direction angle $\psi$ rotates 45° at each step), and the molecule orientation forms a spiral structure.

In general, Sm C* does not only form a spiral construction, but also has an electric dipole 9 in an orthogonal direction to the molecule axis, and shows ferroelectric characteristic.

The ferroelectric liquid crystal was synthesized and proved in 1975, by Meyer et al (J.de. Phys. 36, 69, 1975).

The liquid crystal synthesized at that time is so called DOBAMBC, (2-methyl butyl P-[(P-n-decyloxybenzylidene)amino]

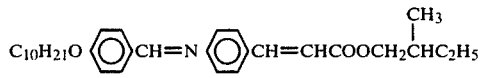

is now largely used in the study of the ferroelectric liquid crystal.

Sm C* has the spiral structure as stated above, and the pitch of the spiral differs by the type of liquid crystal, but is usually a several $\mu$m.

When the liquid crystal which assumes Sm C* is poured into a cell which has a gap of about 1 $\mu$m, thinner than the pitch of the spiral, the spiral structure disappears.

The molecule orientation structure after the disappearance of the spiral structure, is shown in FIG. 5, with the geometric relation with the cell plates 10.

The liquid crystal molecules 8 are parallel to the cell plates 10. Therefore, the liquid crystal molecules 8 are oriented so that the molecule axis is parallel to the plates, and inclines $\theta$ degrees from the normal direction of the layer.

At this point, the normal direction of the layer is parallel to the plates, thus, the layer is formed orthogonally relative to the plates. When the molecule axis inclines $\theta$ degrees from the normal direction of the layer, the domain which is inclined $\theta$ degrees in a clock-wise direction from the normal, and the domain which is inclined $\theta$ degrees in anticlock-wise direction, exist together.

Sm C* liquid crystal molecule generally has an electric dipole 9 which is orthogonal to the molecule axis. If an electric dipole is oriented upwardly relative to the cell plates in one domain, another dipole is oriented downwardly in the other domain.

When an electric field is applied between these cell plates, the liquid crystal molecule of the whole cell is oriented in a bi-stable position $+\theta$ or $-\theta$ inclined from the normal direction of the layer as shown in FIGS. 6a and 6b ($+$, $-$ are determined according to the direction of the electric dipole). Hereinafter, we refer to these positions as $+\theta$ position, and $-\theta$ position.

When the electric field is applied oppositely to the liquid crystal layer, the liquid crystal molecule moves either from $+\theta$ position to $-\theta$ position, or from $-\theta$ position to $+\theta$ position according to the direction of the applied electric field. As the whole molecules of the cell orient at either $+\theta$ position or $-\theta$ position, this phase structure is Sm C. The Sm C phase is caused by the dissapearance of the spiral structure and by making the cell gap thinner.

However, because of an inherency of the original spiral structure, when this Sm C moves from the $\pm\theta$ position to the opposite position, the molecule moves along the cone as shown in FIG. 4b. Usually, Sm C does not undergo such movement as this, even when the electric field is applied thereto.

By suitably selecting the polarity of the electric field, by moving the liquid crystal molecules between $+\theta$ position and $-\theta$ position, and by attaching polarizers on the two cell plates, this cell can be used as a display element.

FIGS. 6a and 6b show the relation between the two polarizers and the $\pm\theta$ positions of liquid crystal molecule, when using the cell as a display element.

Referring to FIG. 6a, the polarizing axis 12 of the polarizer on the incidence side is matched to $+\theta$ position. The polarizer on the outgoing or transmitting side has the polarizing axis 11 displaced by 90° from the axis 12 of the polarizer on the incidence side.

As shown in FIG. 6a, when the liquid crystal molecule is in the $+\theta$ position, the light polarized by the polarizer on the incidence side reaches the polarizer on the outgoing side without changing the polarizing direction, but as the polarizers cross at right angle, the light is not radiated from the outgoing side.

This condition is the dark condition. On the other hand, if the liquid crystal molecule moves to the $-\theta$ position, the light is radiated from the outgoing side according to the birefringency of the liquid crystal.

If $\theta$ is 22.5° and the thickness of cell is appropriate, most of the light align with the polarizing direction of the outgoing side polarizer, and the cell becomes the bright condition.

To obtain an ideal display condition as described above, the relation between the cell thickness d and the anisotropy $\Delta n$ of the refractive rate n of the liquid crystal, shown as below, is necessary:

$$d = (2n-1)\alpha/\Delta n$$

Where,
$\alpha = C\pi/\omega$,
$C$ = light speed
$\omega$ = angular frequency of light FIG. 6b shows the case when the directions 11, 12 of the polarizers of both incidence and outgoing sides, are the same.

In this case, $+\theta$ position corresponds to the bright condition, and the $-\theta$ position corresponds to the dark condition. The relation between the cell thickness d and $\Delta n$ is the same as the above formula. An ideal bright-dark switching is attained when $\theta = 22.5°$.

This type of the display element was first announced by Clark and Lagerwall (Appl. Phys. lett. 36, 899, 1980).

They stated that a display element with a thinner cell and two attached polarizers, has such characteristics as follows;
(1) High-speed response of $\mu$ sec. order
(2) Memorizing characteristic
(3) Desirable threshold value characteristic Among these characteristics, the memorizing characteristic still exists in the inventive cell, and this characteristic enables the cell to maintain the bright or dark condition even when the electric field is turned off, after the high-speed response and after the electric field is applied to the liquid crystal to switch between $+\theta$ or $-\theta$ position.

According to our experiments, however, the existence of the desirable threshold value was not confirmed.

SUMMARY OF THE INVENTION

An object of the invention is to provide a new ferroelectric liquid crystal electro-optical device.

Another object of the invention is to provide a ferroelectric liquid crystal electro-optical device with high speed driving means.

BRIEF DESCRIPTION OF THE DRAWINGS

FIG. 1 is a block diagram of the liquid crystal display device of the present invention.

FIGS. 2a, 2b and 2c show typical crystal structures of nematic, smectic A, and smectic C.

FIG. 9 shows an embodiment of the drive method used in fixed display.

FIGS. 10a, 10b, and 10c show an embodiment of the drive wave-form applied to picture elements, at the time of scanning partially.

FIG. 10a shows the drive wave-form applied to picture elements on non-scanning electrodes. FIGS. 10b and 10c show the drive wave-forms applied to picture elements on the scanning electrodes.

DETAILED DESCRIPTION OF THE INVENTION

Figure 3:
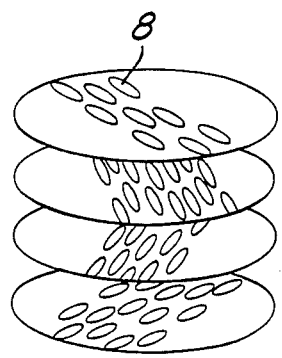
FIG. 3 shows a typical crystal structure of chiral nematic.
Figure 4A:
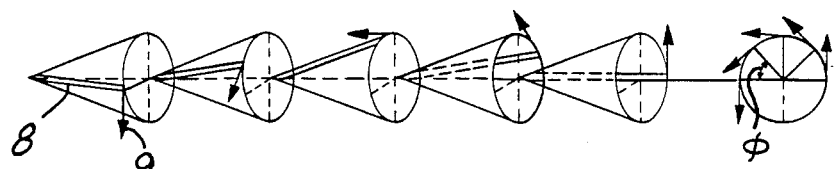
FIGS. 4a and 4b show a typical molecule alignment of chiral smectic C.
Figure 4B:
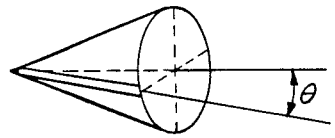
Figures 5, 6A, 6B:
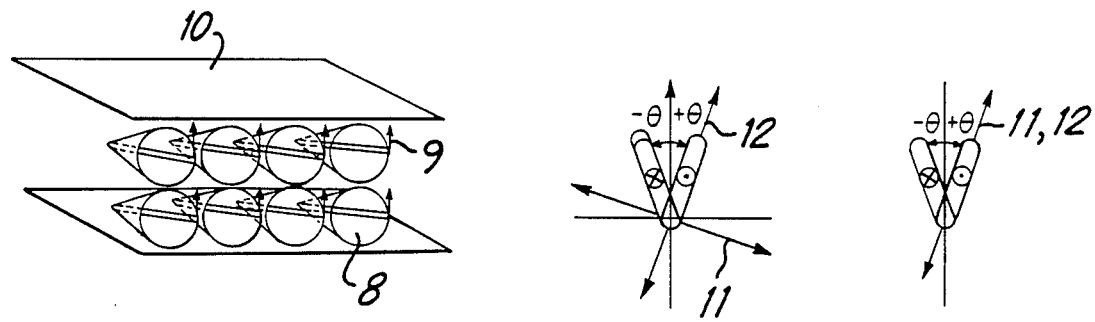
FIG. 5 shows the molecule configuration when the gap of the cell is from about 3 to 1 $\mu$m.
FIGS. 6a and 6b show the relation between the polarizers and the position of the molecule, when liquid crystal chiral smectic C is used as a display element.
Figure 7A:
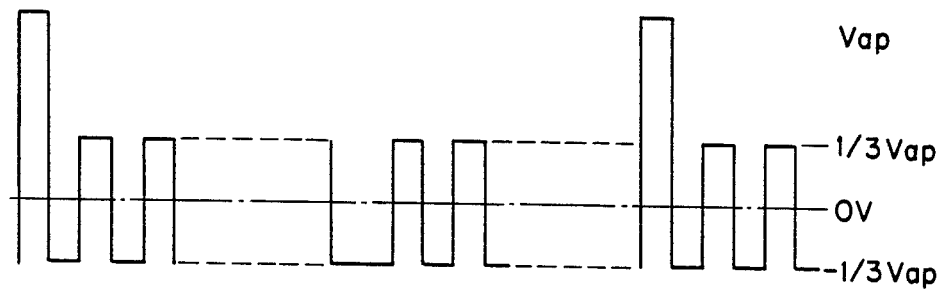
FIGS. 7a and 7b show the embodiments of drive wave-forms which drive the chiral smectic C.
Figure 7B:
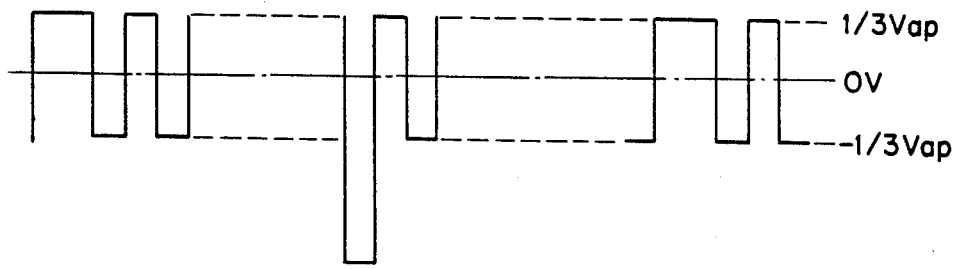

A new drive method for a ferro-electric liquid crystal electro-optical device is suggested in a copending application, wherein two bi-stable optical conditions in the form of bright and dark conditions are selected by applying the drive wave-form as shown in FIGS. 7a and 7b to the liquid crystal.

In this drive method, the liquid crystal molecules are moved to the $+\theta$ or $-\theta$ position by applying high positive or negative voltage pulse to the selected picture element, and then the device maintains the display condition (the position of the molecule) by applying low AC pulse to non-selected picture elements. This drive method is an embodiment of the drive method using the characteristics of ferroelectric liquid crystal.

Figure 8:
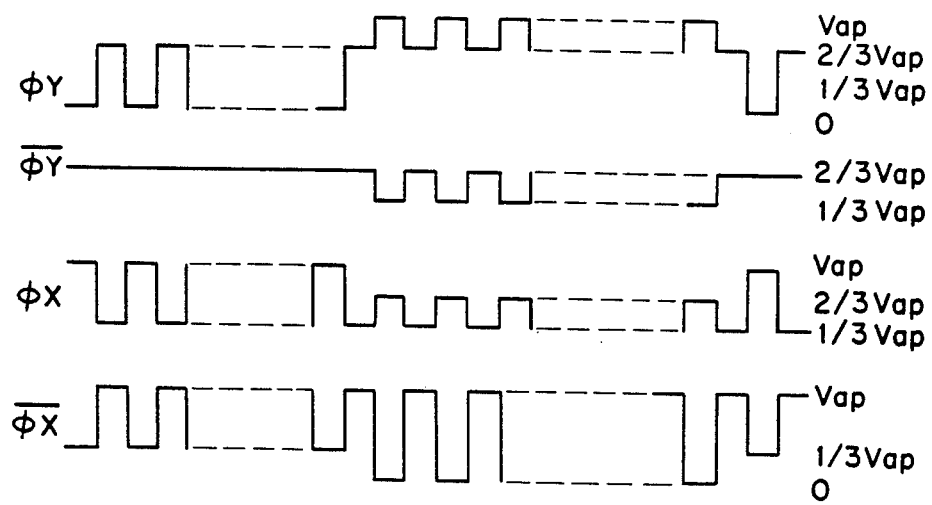
FIG. 8 shows the basic drive signals $\phi y$, $\overline{\phi}y$, $\phi x$, $\overline{\phi}x$, which constitute the wave-forms shown in FIGS. 7a and 7b.

FIG. 8 shows an embodiment of the four signals, $\phi y$, $\overline{\phi}y$, $\phi x$, $\overline{\phi}x$, which are the basic signals to attain the above stated drive method.

Signals $\phi y$, $\overline{\phi}y$, $\phi x$, $\overline{\phi}x$, are respectively named as follows; $\phi y$ = selecting scanning electrode signal $\overline{\phi}y$ = non-selecting scanning electrode signal $\phi x$ = selecting display electrode signal $\overline{\phi}x$ = non-selecting display electrode signal These signals are selected by the scanning signal and the display data, and are applied to scanning electrodes and the display electrodes.

Meanwhile, at the time when the response time of the ferroelectric liquid crystal is almost the same as the time-length or width of the high positive and negative pulses of the drive wave-forms of FIGS. 7a and 7b, the contrast between the bright condition and dark condition is most distinct, and usually the time length or pulse width is selected to be almost the same length as the reponse time.

Presently, the response time $\tau$ of the so called MBRA (the structure formula is set forth below) used at a temperature $\tau$ of close to the room temperature, is 500 ($\mu$sec.), when T = 30° C.

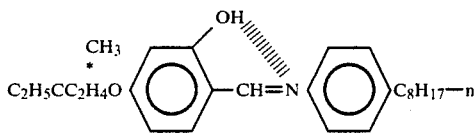

However, this response time is measured when one-axis orientation is processed onto both upper and lower plates.

Writing time of one picture is about 0.8 seconds in the case when the picture comprises about 400 scanning lines under the above mentioned condition.

Therefore it is impossible to conceal the scanning operation from human eyesight, when the frame frequency is set to 30 Hz.

Therefore, the drive method shown in FIG. 9 is used for displaying pictures of small movement, or fixed or stationary pictures.

Namely, the writing of the picture elements is performed by the drive method shown in FIG. 7, and then the picture elements are turned into a high-impedance condition, so as to use the memorizing characteristic.

The technique has such problems as, when rewriting whole of the picture as to change one part of the picture, it takes about 0.8 seconds in the case of using MBRA, and thus it is difficult to see.

In the present invention, partial rewriting is performed, by scanning only the scanning electrodes corresponding to the changing portion of the picture, when remaining scanning electrodes are in a non-selected condition. According to the present invention, it is possible to control the picture effectively by rewriting partially and to remove the difficulty in seeing the picture when the picture is changing without rewriting whole of the picture.

When the device is driven as described above, the drive wave-form shown in FIGS. 10a and 10b is applied to the liquid crystal of the picture elements which are located between the scanning electrodes corresponding to the changing portion of the picture and the display electrodes at the intersections thereof.

The wave-forms shown in FIGS. 10b and 10c respectively establish the bright and dark conditions (the opposite dark and bright conditions are possible according to the selection of the polarizers' arrangement). The drive wave-form shown in FIG. 10a is applied to the liquid crystal of the picture elements which are located between the scanning electrodes corresponding to the unchanging portion of the picture and the display electrodes. This drive wave-form comprises AC pulse, and the display does not change.

The explanation of the embodiment according to this invention in conjunction with the drawings is as follows;

FIG. 1 is the block diagram of the liquid crystal display device of this invention. Control circuit 2 outputs the signal 7 which determines the first and a last scanning electrodes for starting and finishing the scan respectively, to the start-finish scanning address designation circuit 3.

Circuit 3 outputs the partial scanning signal to scanning electrode drive circuit 4.

Figure 11:
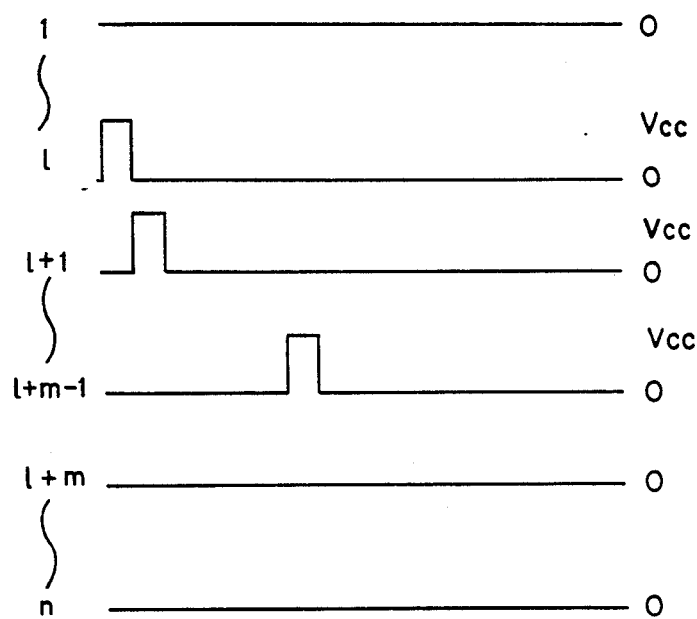
FIG. 11 shows an embodiment of the scanning signal fed to the scanning electrode drive circuit, at the time of scanning partially.

The embodiment of the scanning signal fed to each of the scanning electrodes in this condition, is shown in FIG. 11.

There are scanning electrodes numbered from 1 to n, and among them, lines of scanning electrodes from No. 1 to No. 1+m−1 are scanned. The other scanning electrodes are not scanned, and the signal fed to the scanning electrode drive circuit 4 becomes Low level.

In the scanning electrode drive circuit 4, when the scanning signal is High level, $\phi y$ shown in FIG. 8 is selected and applied to m lines of the scanning electrodes or a scanning range from No. 1 to 1+m−1. When the scanning signal is at low level, $\overline{\phi y}$ shown in FIG. 8 is selected and applied to the scanning electrode. To the other scanning electrodes which are not partially scanned, $\overline{\phi y}$ is selected and applied.

Apparently, the display data must indicate the display condition of the picture elements on the partially scanned scanning electrodes from No. 1 to 1+m−1 or the scanning range.

Therefore, the display data is fed to the display electrodes, and the display data is initialized to correspond to the scanning electrode No. 1 for matching timely to the scanning.

According to the ferroelectric liquid crystal panel, it is possible to rewrite the picture without changing some parts of the picture, by partially scanning the changing part of the scanning electrode.

Rewrite of the picture is thus performed, and no partial alternation of the picture is sensed by human eyesight.

Furthermore, when considering the outer computers that process information, only the changing data is transmitted to the control circuit at the changing time. At other times, the outer computer can do other processes.

Consequently, the display device of this invention has a remarkable effect in visual point and information process.

What is claimed is:

1. A ferro-electric liquid crystal electro-optical device driven in a time-sharing mode comprising: a panel having a plurality of scanning electrodes, a plurality of display electrodes and a ferro-electric liquid crystal material disposed between the scanning electrodes and the display electrodes; drive means for scanning the scanning electrodes and for feeding display data signals to the display electrodes so as to produce a picture on the panel; and control means for controlling said drive means to enable the same to scan only a part of the scanning electrodes for partially rewriting the picture produced by the panel.

2. An electro-optical device as claimed in claim 1; wherein the ferro-electric liquid crystal material comprises a chiral smectic ferro-electric liquid crystal.

3. An electro-optical device as claimed in claim 1; wherein the electro-optical device comprises a display device.

4. An electro-optical device as claimed in claim 1; wherein the electro-optical device comprise a shutter for a printer.

5. An electro-optical device as claimed in claim 1; wherein the control means includes a start-finish scanning address designation circuit for designating the part of the scanning electrodes to be scanned by the drive means.

6. An electro-optical device as claimed in claim 1; wherein the drive means applies an AC pulse voltage to the ferro-electric liquid crystal corresponding to the non-rewritten portion of the picture during the scanning so as to substantially maintain the display condition of the non-rewritten portion.

7. An electro-optical device as claimed in claim 1; wherein the drive means applies a voltage to the ferro-electric liquid crystal for changing the display condition of the picture corresponding to the rewritten portion of the picture and applies an AC pulse voltage to the ferro-electric liquid crystal for substantially maintaining the display condition of the picture corresponding to the rewritten portion of the picture during the scanning.

8. An electro-optical device as claimed in claim 1; wherein the drive means imparts a high-impedance condition to both the rewritten and non-rewritten portions of the picture so that the conditions of the rewritten and non-rewritten portions of the picture are memorized after rewriting.

9. An electro-optical device as claimed in claim 8; wherein the drive means imparts the high-impedance condition to the entire picture after rewriting.

10. An electro-optical device as claimed in claim 2; wherein the thickness of the chiral smectic ferro-electric liquid crystal material is thinner than the spiral pitch of the chiral smectic ferro-electric liquid crystal so that the liquid crystal loses the spiral structure and the molecules of the liquid crystal have bi-stable positions.

11. An electro-optical device as claimed in claim 10; wherein the drive means applies a voltage to the ferro-electric liquid crystal corresponding to the rewritten portion of the picture so that the liquid crystal molecules are moved from one of the bi-stable positions to the other, and applies an AC pulse voltage to the ferro-electric liquid crystal corresponding to the non-rewritten portion of the picture so that the liquid crystal molecules are not moved from one of the bi-stable positions to the other.

12. An electro-optical device comprising: a panel for producing a picture, the panel comprising a ferro-electric liquid crystal layer, and scanning electrodes and display electrodes sandwiching therebetween the ferro-electric liquid crystal layer to define a plurality of picture elements at intersections of the scanning and display electrodes, the picture elements exhibiting one of two bi-stable optical conditions to collectively define the picture; a first drive circuit for scanning the scanning electrodes to successively select the picture elements aligned along respective scanning electrodes; a second drive circuit connected to the display electrodes and cooperative with the first drive circuit for applying a pulse to the selected picture elements to change the bi-stable optical condition thereof, and for applying AC pulses to the non-selected picture elements to hold the bi-stable optical condition thereof; and control means connected to the first and second drive circuits and operative during a partial rewriting of the picture for designating a scanning range of the scanning electrodes corresponding to the rewritten portion of the picture so as to enable the first drive circuit to scan only the designated range of the scanning electrodes, and to enable the second drive circuit to apply the AC pulses to the picture elements located outside the designated scanning range.

13. An electro-optical device as claimed in claim 12; wherein the picture elements selectively exhibit a bright condition and a dark condition.

14. An electro-optical device as claimed in claim 13; wherein the second drive circuit includes means for applying a pulse of a given polarity to switch the selected picture elements from the dark to the bright condition, and for applying a pulse of an opposite polarity to switch the selected picture elements from the bright to the dark condition.

15. An electro-optical device as claimed in claim 12; wherein the control means includes means for designating the two scanning electrodes firstly and lastly scanned by the first drive circuit to thereby designate the scanning range.

16. An electro-optical device as claimed in claim 12; wherein the ferro-electric liquid crystal layer comprises a chiral smectic ferro-electric liquid crystal.

17. An electro-optical device as claimed in claim 12; wherein the control means includes means for enabling the first and second drive circuits to connect a high-impedance to the picture elements after the scanning operation.

18. An electro-optical device as claimed in claim 12; wherein the panel includes means for establishing the two bi-stable optical conditions of the picture elements based on bi-stable alignment of the molecules of the ferro-electric liquid crystal layer.

19. An electro-optical device as claimed in claim 12; wherein the electro-optical device comprises a display device.

20. An electro-optical device as claimed in claim 12; wherein the electro-optical device comprises a shutter for a printer.

* * * * *